United States Patent Office 3,229,932
Patented Jan. 18, 1966

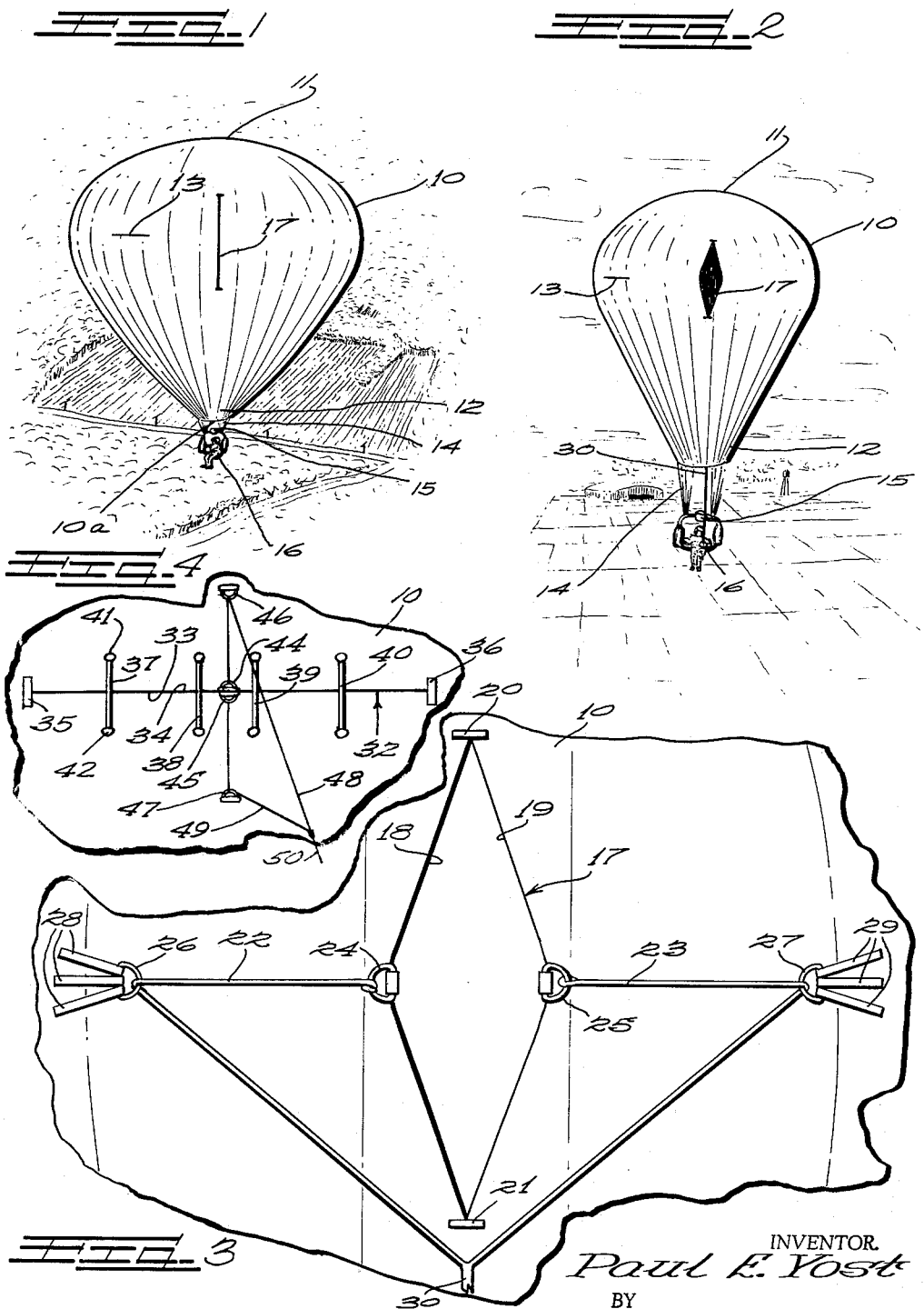

3,229,932
MANEUVERING VALVE FOR HOT AIR BALLOON
Paul E. Yost, Sioux Falls, S. Dak., assignor to Raven Industries, Inc., Sioux Falls, S. Dak., a corporation of South Dakota
Filed July 9, 1964, Ser. No. 381,448
14 Claims. (Cl. 244—31)

The present invention relates to improvements in balloons and more particularly to a buoyancy lift control for releasing gas from a hot air balloon for causing the balloon to descend at a controlled rate for landing.

The present invention primarily contemplates use in a manned flight hot air balloon having a burner for continually generating hot gas for maintaining the balloon aloft. When landing is to occur the pilot turns off the burning heat generator, or turns it to minimum heat generation, for reducing the free lift to land the balloon. The landing technique heretofore utilized was to allow the balloon to descend to a level of about 100 feet above the terrain and to level off at this altitude by the control of the burner. A suitable landing site would be selected ahead of the balloon and in the path of the flight. The heat generator would then be turned down to allow the air on the balloon to cool and render the balloon system heavy so as to descend.

It has been found to be extremely difficult to ascertain the time lag between the burner adjustment and the descent of the balloon. Consequently it became the practice to make a number of landing attempts prior to reaching the desired landing spot or in some cases the landing field was overshot.

It is accordingly an object of the present invention to provide a method and apparatus for controlling the balloon system so as to render it heavy at will for being able to accurately select balloon landing locations and bring the balloon safely and quickly down to earth.

A further object of the invention is to provide a hot air balloon structure wherein a portion of the hot air can be expelled from the balloon as needed so as to render the system heavy when desired.

A further object of the invention is to provide an improved valving arrangement for safely expelling a portion of hot air from within the balloon and wherein the valving arrangement will automatically close when released and will not accidentally open during flight so as to endanger the balloon pilot.

The invention, in one form, contemplates providing a balloon envelope having a natural shape with an absence of horizontal stresses on the balloon material with a vertical slit in the balloon envelope material located substantially at the balloon equator and spreader lines connected to the sides of the slit operable by the pilot pulling an operating line to spread the sides of the slit to decrease the free lift of the balloon, with the sides automatically drawing together when the operating line is released.

Other objects, advantages and features will become more apparent with the teaching of the principles of the present invention in connection with the disclosure of the preferred embodiment thereof in the specification, claims and drawings, in which:

FIGURE 1 is a side elevational view shown somewhat schematically illustrating a balloon in flight, which is constructed and operates in accordance with the principles of the present invention;

FIGURE 2 illustrates the balloon of FIGURE 1 during the time when the free lift is being reduced rapidly;

FIGURE 3 is a detailed fragmentary elevational view taken from within the balloon showing the structure of the mechanism for reducing the balloon free lift; and FIGURE 4 is a fragmentary detailed elevational view taken from within the balloon showing a structure wherein a horizontal slit is used.

As shown on the drawings:

As illustrated in FIGURE 1 a balloon 10 is provided having an upper end 11 and a lower end 12. The balloon or balloon envelope 10 is formed of a light weight flexible material such as polyethylene on the order of one-half to 1 mil thick laminated to a material having relatively high tensile strength such as woven nylon. Other conventional balloon materials may be employed.

At the lower end of the balloon is an opening 10a and to which a flow of heated gases and hot air pass to maintain the balloon aloft. The hot gases are provided from a burner 15 supported on load lines 14 connected to the balloon.

Also supported at the lower end of the balloon is a pilot support 16 such as in the form of a seat. While the features of the invention may be employed in other types of balloons, they are particularly well adapted to a manned flight balloon wherein the pilot sits in the support at 16 and manually controls the burner 15 to maintain the balloon aloft at the desired altitude. At the termination of the flight the pilot reduces the rate of gas generation of the burner 15 to bring the balloon down near the earth, on the order of 100 feet as described above. When the landing site is chosen, the balloon system is rapidly made heavy to reduce the free lift by opening a slit 17 which is formed in the side of the balloon.

The balloon envelope 10 is constructed with a "natural" shape which will be fully appreciated by those skilled in the art and need not be described in detail. In the well known natural shape the ballon envelope has an absence of horizontal stresses and the material of the balloon envelope is shaped to afford this lack of horizontal stress on the material. Thus the slit 17 will remain closed until the sides of the slit are forcibly drawn apart. During flight no forces are applied to the sides of the slit and the sides remain together preventing the escape of gas.

The slit 17 is simply formed in the balloon by either providing a vertical cut in the material or leaving a separation unsealed portion between balloon gores, if the balloon is originally formed in gores. FIGURE 2 shows the sides of the slit separated to permit escape of hot air from within the balloon.

FIGURE 3 shows the slit in further detail, and cross tapes 20 and 21 may be heat sealed, cemented or sewn to the balloon surfaces at the ends of the slit to prevent the slit from tearing beyond its predetermined length. The slit is preferably constructed so that it is centered at the equator with the ends extending an equal distance above and below the equator 13. The length of the slit is related to the size of the balloon and to the balloon length.

The length of the slit is related to the size of the balloon, and preferably to the balloon volume. The width of the slit when fully open should preferably be from $\frac{1}{5}$ to $\frac{1}{3}$ of the length. Further, the total area of the opening should be related to the balloon volume. The ratio of the open area of the valve, in square units, to the balloon's volume, in cubic units, should be $\frac{1}{2000}$ to $\frac{1}{500}$. A preferred relationship is to provide a valve area which has the ratio of $\frac{1}{1200}$ of the balloon volume (e.g., valve area of 50 sq. ft. with volume of 60,000 cu. ft.). The relationship set forth above is followed with either a vertical slit or a horizontal slit.

In a vertical slit the slit extends equidistant above and below the balloon equator. The sides 18 and 19 of the slit are normally held closed during flight by vertical stresses on the balloon material. As shown in FIGURE 3, means are provided for spreading the sides 18 and 19 of the slit 17 when gas is to be released. These may be in the form of spreader lines 22 and 23 which are connected at their inner ends to the sides of the slit such as by being held thereto by D-rings 24 and 25 attached to the material at the edges of the slit.

The spreader lines 22 and 23 extend horizontally away from the slit sides 18 and 19 and are threaded through D-shaped eyelets 26 and 27 with the outer ends of the spreader lines extending downwardly and joined at 30. The eyelets 26 and 27 are secured to the inner surface of the balloon such as by tapes 28 and 29 cemented, heat sealed or sewn to the balloon material.

Extending downwardly from the spreader lines 22 and 23 is an operating or control line 30. The control line 30 extends downwardly through the balloon gas opening 10a down to be accessible to the pilot in the pilot support 16. Guide eyelets may be provided for the control line 30 within the balloon if desired and the control line may be held by eyelets or guides to the side of the opening so as to not be burned by the hot air passing up through the balloon opening 10a.

When the pilot decides that the balloon is to be landed, he pulls downwardly on the control line 30 which pulls the sides 18 and 19 of the slit apart to the position shown in FIGURE 3. This will cause relatively rapid escape of gas from within the balloon and the balloon will land.

When the control line 30 is released the vertical stresses on the balloon material will hold the sides 18 and 19 of the slit together insuring that the slit opening will be closed. Thus the slit opening will remain closed during flight and during preparation for launching it will again close (after the balloon has landed and the pilot releases the control line 30).

While a vertical slit is preferred in some circumstances, the opening could nearly as easily be horizontal with little change in structure. Further, the same result might follow by using any sort of valve which could be rolled up, pulled inwardly and otherwise manipulated for opening and closing the side wall of the balloon. FIGURE 4 illustrates an arrangement wherein a horizontal slit is applied.

The portion of a balloon wall 10' is illustrated having the dimensional relationship to the balloon as above stated. The slit 32 has separable edges 33 and 34 which may be enforced, and the ends of the slit also may be reinforced such as by tapes 35 and 36 to prevent tearing at the ends.

Means are provided to hold the edges 33 and 34 of the slit together during normal flight to prevent the escape of gas. For example springs or elastic cords 37, 38, 39 and 40 are shown suitably attached to the inner surface of the balloon wall such as by adhesive patches 41 and 42 or by being heat sealed or sewn thereto. The elastic members may also be attached to the outer surface of the balloon wall.

For pulling the sides of the slit 32 apart for releasing gas, pull lines 48 and 49 are provided attached to a common line 50 which leads downwardly within the balloon to be accessible at the pilot's seat. The line 48 passes through a ring 46 suitably attached to the balloon wall and downwardly to a ring 44 secured to upper edge 33 of the opening. Similarly, the lower line 49 passes through a ring 47, suitably attached to the balloon wall, and secured at its upper end to a ring 45 connected to the lower edge 34 of the opening. As will be observed, as the lines 48 and 49 are pulled downwardly from the pilot's seat, the opening 32 will separate to prevent the escape of gas, and when tension on the lines 48 and 49 is released the opening 32 will close, and will remain closed during normal flight.

It will be understood that the horizontal slit should be at the equator or above and preferably is at a location above the equator for the rapid release of gas. The higher the slit is located on the balloon the smaller the slit can be relative to the balloon size.

Thus, it will be seen that I have provided an improved buoyancy lift control structure for a balloon which meets the objectives and advantages above set forth. The arrangement is provided without requiring the addition of any substantial weight to the balloon. Both horizontal and vertical slits offer advantages and with a vertical slit arrangement the slit closes automatically and is held closed by the natural forces on the balloon thus preventing inadvertent malfunction of any valving arrangement.

The vertical slit arrangement may be used in some circumstances for control of the position of the balloon. The spreader lines 22 and 23 may be led separately down to the pilot so that either line can be drawn apart. By pulling on either line and pulling either one of the sides 18 and 19 of the slit outwardly while permitting the other side to remain in position, the escaping gas will tend to rotate the balloon. Thus as the pilot wishes to face in the direction that the balloon is travelling he may rotate the balloon and rotate his position by pulling either one of the spreader lines 22 or 23 independent of the other.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A buoyancy lift control for a hot air balloon comprising a balloon envelope formed of a light weight flexible material having a lower inflation opening for receiving hot air and having a natural shape with an absence of horizontal stresses on the balloon material, a burner carried on the balloon for directing hot air into said opening during flight, a pilot support carried on the balloon for supporting a pilot below the balloon, means defining a vertical slit in the balloon envelope material located substantially at the balloon equator, spreader lines attached to the sides of the slit and extending laterally therefrom within the balloon envelope, eyelet means within the balloon envelope laterally outwardly of the slit receiving the lines leading away from the slit and extending through the eyelet means and downwardly, and an operating line connected to said spreader lines and extending downwardly within the balloon through said inflation opening to said pilot support so that the sides of said slit can be separated by the pilot at will permitting the escape of hot air from the balloon.

2. A buoyancy lift control for a hot air balloon comprising a balloon envelope formed of a light weight flexible material having a lower inflation opening for receiving hot air and having a natural shape with an absence of horizontal stresses on the balloon material, a burner carried on the balloon for directing hot air into said opening during flight, a pilot support carried on the balloon for supporting a pilot below the balloon, means defining a vertical slit in the balloon envelope material located substantially at the balloon equator having substantially straight sides which are together when the slit is closed and separated when the slit is opened, spreader means for spreading the sides of said slit for permitting the escape of hot air for decreasing the free lift of the balloon, and operating means connected to said spreader means and accessible from said pilot support.

3. A buoyancy lift control for a balloon comprising
a balloon envelope of a light weight material,
load carrying means at the lower end of the balloon,
means defining a vertical slit in the envelope material in the side of the balloon envelope having substantially straight sides which are together when the slit is closed and separated when the slit is opened,
and spreader means for controllably separating said slit for the escape of gas from the balloon envelope.

4. A buoyancy lift control for a balloon comprising,
a balloon envelope of a light weight material having a natural shape with an absence of horizontal stresses at the equator,
means defining a vertical slit substantially at the equator having substantially straight sides which are together when the slit is closed and separated when the slit is opened,
and means for drawing apart the sides of the slit at will for permitting the escape of gas from the balloon.

5. A buoyancy lift control for a hot air balloon comprising
a balloon envelope of a light weight material,
load carrying means at the lower end of the balloon for supporting a pilot,
said balloon envelope having a natural shape with an absence of horizontal stresses at the equator,
means defining a vertical slit in the balloon envelope at the equator having substantially straight sides which are together when the slit is closed and separated when the slit is opened,
means for drawing apart the sides of the slit for permitting the escape of gas from within the balloon,
burner means carried on the balloon for generating and delivering hot air to the balloon during flight,
and an operating line connected to said means for drawing apart the sides of the slit and accessible to the pilot supported on said load carrying means.

6. A buoyancy lift control for a hot air balloon comprising,
a balloon envelope formed of a light weight flexible material having a lower inflation opening for receiving hot air and having a natural shape with an absence of horizontal stresses on the balloon material,
a burner carried on the balloon for directing hot air into said opening during flight,
a pilot support carried on the balloon for supporting a pilot below the balloon,
means defining a vertical normally closed slit in the balloon envelope material extending the same distance above and below the equator having substantially straight sides which are together when the slit is closed and separated when the slit is opened,
and pilot operated spreader means for opening said slit and permitting the escape of gas from the balloon to reduce the free lift.

7. A buoyancy lift control for a hot air balloon comprising
a balloon envelope formed of a light weight flexible material having a layer of gas impermeable plastic and a layer of relatively high tensile strength material,
load lines extending below the balloon envelope,
an opening in the lower end of the balloon envelope for receiving hot air,
a burner carried on the load lines directing hot air to said opening,
a pilot chair supported on the load lines beneath the balloon envelope,
a vertical slit in the balloon envelope having its center at the balloon equator and having reinforcing strips at the end of said slit,
first and second spreader lines secured at their inner ends to the sides of the slit and extending laterally outwardly therefrom,
D-rings secured to the inner surface of the balloon envelope by tapes secured to the balloon envelope and receiving said spreader lines with the outer ends of the spreader lines extending downwardly and joined,
and an operating line connected to the outer ends of the spreader lines extending down within the balloon through the balloon opening to the pilot seat for controllably drawing apart the sides of the slit for reducing the free lift of the balloon in advance of landing the balloon.

8. A buoyancy lift control for a balloon comprising,
a balloon envelope of a light weight material,
load carrying means at the lower end of the balloon,
means defining a normally closed slit in the envelope material in the side of the balloon envelope having substantially straight sides which are together when the slit is closed and separated when the slit is opened, and means for controlling the opening of said slit during flight for the escape of gas from the balloon envelope.

9. A buoyancy lift control for a balloon comprising,
a balloon envelope of a light weight material,
means at the lower end of the balloon envelope for carrying a load therefrom,
a horizontal normally-closed slit in the balloon envelope wall having separable edges having substantially straight sides which are together when the slit is closed and separated when the slit is opened,
means urging the edges of said slit together preventing the escape of gas from the envelope during normal flight, and
opening means for forcibly drawing the edges apart for the escape of gas from the envelope.

10. A buoyancy lift control for a balloon comprising,
a balloon envelope formed of a light weight material,
means at the lower end of the envelope for carrying a load therefrom,
means defining a normally-closed slit in the envelope material having a length in the range of ⅕ to ⅓ of the vertical length of the balloon envelope having substantially straight sides which are together when the slit is closed and separated when the slit is opened, and means for separating the slit in the envelope for the escape of gas therefrom.

11. A buoyancy lift control for a balloon comprising,
a balloon envelope of a light weight material,
load carrying means at the lower end of the balloon,
means defining a normally-closed slit in the envelope material in the side of the balloon envelope having substantially straight sides which are together when the slit is closed and separated when the slit is opened, and
spreader means for controllably separating said slit for the escape of gas from the balloon envelope,
the ratio of the open area of said slit being in the range of ½₀₀₀ to ⅕₀₀ of the balloon volume.

12. A buoyancy lift control for a balloon comprising,
a balloon envelope of a light weight material,
load carrying means at the lower end of the balloon,
means defining a normally closed slit in the envelope material in the side of the balloon envelope having substantially straight sides which are together when the slit is closed and separated when the slit is opened, and
spreader means for controllably separating said slit for the escape of gas from the balloon envelope,
the ratio of the open area of said slit being ¹⁄₁₂₀₀ of the balloon volume.

13. A buoyancy lift control for a balloon comprising,
a balloon envelope of a light weight material having a normally-closed slit in said material, said slit having a first edge and a second edge, load carrying means at the lower end of the balloon, urging means for urging said edges together into a normally-closed position for preventing the escape of gas from the envelope during normal flight, and control means for drawing the first edge away from the normally-closed position for the escape of gas from the envelope so that the balloon rotates in a first direction about the vertical axis of the balloon and for alternatively and selectively drawing the second edge away from the normally-closed position for the escape of gas from the envelope so that the balloon rotates in a second direction about the vertical axis of the balloon.

14. A buoyancy lift control for a hot air balloon comprising:
   a balloon envelope formed of a lightweight flexible material having a layer of gas impermeable plastic in a layer of relatively high tensile strength material,
   load lines extending below the balloon envelope,
   an opening in the lower end of the balloon envelope for receiving hot air,
   a burner carried on the load lines directing hot air to said opening,
   a pilot seat supported on the load lines beneath the balloon envelope,
   a normally-closed vertical slit in the balloon envelope having its center at the balloon equator and having reinforcing strips at the end of said slit,
   said slit having a first edge and a second edge, first and second spreader lines secured at their inner ends to the first and second edges respectively and extending laterally outward therefrom,
   D-rings secured to the inner surface of the balloon envelope by tapes secured to the balloon envelope and receiving said spreader lines with the outer ends of the spreader lines extending downwardly within the balloon through the balloon opening to the pilot seat, and
   control means connected to the first and second spreader lines for drawing the first edge away from the normally-closed position for the escape of gas from the envelope so that the balloon rotates in a first direction about the vertical axis of the balloon and for alternatively and selectively drawing the second edge away from the normally-closed position for the escape of gas from the envelope so that the balloon rotates in a second direction about the vertical axis of the balloon.

References Cited by the Examiner
UNITED STATES PATENTS

| | | | |
|---|---|---|---|
| 1,190,376 | 7/1916 | Chione | 244—99 X |
| 1,866,079 | 7/1932 | Blondin | 244—31 |
| 2,384,416 | 8/1945 | Derry | 244—152 |
| 2,756,948 | 7/1956 | Winzen et al. | 244—31 |
| 2,823,876 | 2/1958 | Ebneter | 244—31 |
| 3,096,048 | 7/1963 | Yost | 244—31 |

FERGUS S. MIDDLETON, *Primary Examiner.*

R. G. BESHA, *Assistant Examiner.*